United States Patent
Peng et al.

(10) Patent No.: US 10,630,166 B2
(45) Date of Patent: Apr. 21, 2020

(54) CIRCUIT AND SWITCHING POWER SUPPLY AND LIQUID CRYSTAL DISPLAY DRIVING CIRCUIT

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Xiaofei Peng, Beijing (CN); Jiacheng Huang, Beijing (CN); Shengfei Ma, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 0 days.

(21) Appl. No.: 15/569,064

(22) PCT Filed: Apr. 14, 2017

(86) PCT No.: PCT/CN2017/080581
§ 371 (c)(1),
(2) Date: Oct. 24, 2017

(87) PCT Pub. No.: WO2018/054044
PCT Pub. Date: Mar. 29, 2018

(65) Prior Publication Data
US 2018/0287486 A1    Oct. 4, 2018

(30) Foreign Application Priority Data
Sep. 22, 2016  (CN) .......................... 2016 1 0840370

(51) Int. Cl.
G09G 3/36 (2006.01)
H02M 1/34 (2007.01)
(Continued)

(52) U.S. Cl.
CPC ............... *H02M 1/34* (2013.01); *H02M 1/44* (2013.01); *H02M 3/156* (2013.01); *G09G 3/36* (2013.01);
(Continued)

(58) Field of Classification Search
CPC ....................................................... G09G 3/36
See application file for complete search history.

(56) References Cited

U.S. PATENT DOCUMENTS

| 5,414,613 A | * | 5/1995 | Chen | ...................... H02M 1/34 323/210 |
| 5,847,548 A | | 12/1998 | He et al. | |

(Continued)

FOREIGN PATENT DOCUMENTS

| CN | 102122891 | 7/2011 |
| CN | 102403712 | 4/2012 |

(Continued)

OTHER PUBLICATIONS

International Search Report with English Language Translation, dated Jul. 21, 2017, Application No. PCT/CN2017/080581.
(Continued)

*Primary Examiner* — Olga V Merkoulova
(74) *Attorney, Agent, or Firm* — Womble Bond Dickinson (US) LLP

(57) ABSTRACT

The disclosure discloses an absorption circuit which is coupled to a switching power supply, wherein the absorption circuit comprises: a switching power supply voltage spike suppression circuit for changing a voltage spike of the switching power supply into a desired voltage spike, an
(Continued)

energy storage circuit which is coupled to the switching power supply voltage spike suppression circuit and used for storing the spike voltage that is suppressed, and a release circuit which is coupled to the energy storage circuit and used for, when the voltage stored by the energy storage circuit is higher than the output voltage of the switching power supply, releasing the energy which is stored by the energy storage circuit and higher than the output voltage to the output terminal of the switching power supply. The disclosure further discloses a corresponding switching power supply and a liquid crystal display driving circuit.

8 Claims, 5 Drawing Sheets

(51) Int. Cl.
*H02M 3/156* (2006.01)
*H02M 1/44* (2007.01)
*H02M 1/00* (2006.01)

(52) U.S. Cl.
CPC ... *G09G 2330/025* (2013.01); *G09G 2330/06* (2013.01); *H02M 2001/0038* (2013.01); *H02M 2001/0048* (2013.01); *H02M 2001/342* (2013.01); *H02M 2001/346* (2013.01); *Y02B 70/1491* (2013.01)

(56) References Cited

U.S. PATENT DOCUMENTS

| | | | | |
|---|---|---|---|---|
| 6,157,179 A * | 12/2000 | Miermans | ............. | H02M 3/155 323/282 |
| 6,903,642 B2 * | 6/2005 | Mayfield | ................. | H01F 27/38 336/176 |
| 6,909,267 B2 * | 6/2005 | Alexander | .............. | H02M 1/44 323/284 |
| 7,142,202 B2 * | 11/2006 | Kigo | .................... | G09G 3/2965 345/205 |
| 7,506,180 B2 * | 3/2009 | Klaffenbach | ......... | H02M 3/157 324/120 |
| 2006/0262577 A1 * | 11/2006 | Schenk | .................... | H02M 1/34 363/50 |
| 2013/0272031 A1 | 10/2013 | Hosotani | | |
| 2015/0061530 A1 * | 3/2015 | Kang | ................. | H05B 33/0815 315/221 |

FOREIGN PATENT DOCUMENTS

| | | |
|---|---|---|
| CN | 103378739 | 10/2013 |
| CN | 203562942 | 4/2014 |
| CN | 104201874 | 12/2014 |
| CN | 204271904 U | 4/2015 |
| CN | 106230246 | 12/2016 |
| JP | 2001-286133 A | 10/2001 |

OTHER PUBLICATIONS

Office Action received for Chinese Patent Application No. 201610840370.5, dated Feb. 23, 2018, 12 pages (6 pages of English Translation and 6 pages of Office Action).

Office Action received for Chinese Patent Application No. 201610840370.5, dated Jan. 9, 2019, 12 pages (6 pages of English Translation and 6 pages of Office Action).

International Preliminary Report on Patentability received for PCT Patent Application No. PCT/CN2017/080581, dated Apr. 4, 2019, 14 pages (9 pages of English Translation and 5 pages of Original Document).

* cited by examiner

CIRCUIT AND SWITCHING POWER SUPPLY AND LIQUID CRYSTAL DISPLAY DRIVING CIRCUIT

RELATED APPLICATION

The present application is the U.S. national phase entry of PCT/CN2017/080581, with an international filing date of Apr. 14, 2017, which claims the benefit of Chinese Patent Application No. 201610840370.5 filed on Sep. 22, 2016, the entire disclosures of which are incorporated herein by reference.

TECHNICAL FIELD

The disclosure relates to the field of circuit, and in particular, to an absorption circuit which losslessly absorbs the spike voltage of a switching power supply and a corresponding switching power supply and a liquid crystal display driving circuit.

BACKGROUND

With the development of power electronics technology, switching power supplies are tending to be miniaturized and lightweight. To reduce the volume and the weight of a power supply, the most feasible approach is to increase the switching frequency. Because of operation in a high frequency state, the effects of parasitic parameters such as the switching transformer leakage inductance, the distributed capacitance, etc. cannot be ignored. For example, in a liquid crystal display driving circuit, in a topology application based on a non-isolated DC to DC (DC/DC) converter, since power devices (which refer to electronic components which output relatively large power) work in a switching state, there exists a very large current change rate, and in a practical switching power supply circuit, there inevitably exist stray inductance and parasitic capacitance, so when working at full load, the voltage spike of the switching power supply will be very high and will take a ringing form, which will not only seriously affect the lifetime and reliability of devices in the circuit, but also cause some loss of efficiency, and meanwhile, high frequency, high di/dt and high dv/dt might bring about large electromagnetic interference (EMI for short). In a situation where the integration level of the liquid crystal display driving circuit is higher and higher and under the application requirements for high definition and high frequency, this problem is particularly prominent and urgently needs to be solved.

Nowadays, there are many approaches which may achieve the purpose of absorption, and in general, they are mainly through two ways, one is to reduce the leakage inductance, and one is to dissipate the energy of the overvoltage. The reduction of the leakage inductance mainly relies on the process, and the dissipation of the energy of the overvoltage is through the absorption circuit in parallel with the transformer and alternatively the switch transistor.

In conventional applications, based on cost and space conditions, the schemes used for absorption circuits are to connect an RC (resistor and capacitor) circuit (see FIG. 1) and alternatively an RCD (resistor, capacitor and diode) circuit (see FIG. 2) at both ends of the switch transistor in parallel. The basic working principle of these absorption circuits is to provide the switch transistor with a bypass when the switch transistor is disconnected, so as to absorb the energy accumulated in the parasitic inductance, and cause the switch voltage to be clamped, thereby suppressing the voltage spikes. Although these schemes have a certain effect and may reduce the magnitude of the spike voltage of the switching power supply, the energy of the reduced spike voltage is heat converted into a large amount of heat by the resistor(s) in the circuit, which lower the conversion efficiency of the switching power supply.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. In addition, the claimed subject matter is not limited to embodiments which resolve any or all of the defects mentioned in any part of the disclosure.

An embodiment of the disclosure provides an absorption circuit for losslessly absorbing the spike voltage of a switching power supply, which is coupled to the switching power supply, wherein the absorption circuit comprises a switching power supply voltage spike suppression circuit for changing a voltage spike of the switching power supply into a desired voltage spike, an energy storage circuit which is coupled to the switching power supply voltage spike suppression circuit and used for storing the spike voltage that is suppressed, and a release circuit which is coupled to the energy storage circuit and used for, when the voltage stored by the energy storage circuit is higher than the output voltage of the switching power supply, releasing the energy which is stored by the energy storage circuit and higher than the output voltage to the output terminal of the switching power supply.

Alternatively or additionally, the switching power supply voltage spike suppression circuit comprises a first diode, the energy storage circuit comprises a capacitor, the release circuit comprises a second diode, and the voltage spike of the switching power supply breaks down the first diode and is absorbed by the capacitor, and when the voltage of the capacitor is higher than the output voltage, the second diode is switched on, thereby releasing the energy that is higher than the output voltage to the output terminal of the switching power supply.

Alternatively or additionally, the breakdown voltage of the first diode is configured as the resultant value of the desired voltage spike minus the output voltage.

Alternatively or additionally, the cathode of the first diode is coupled to the drain of the switch transistor of the switching power supply, the anode of the first diode, one side of the capacitor and the anode of the second diode are connected, the other side of the capacitor is grounded, and the cathode of the second diode is coupled to the output terminal of the switching power supply.

Alternatively or additionally, the first diode is a transient voltage suppressor.

Alternatively or additionally, the second diode is a fast recovery diode.

An embodiment of the disclosure further provides a switching power supply circuit comprising a power supply and a switch transistor as well as an absorption circuit as provided by the previous embodiment.

An embodiment of the disclosure further provides a liquid crystal display driving circuit comprising a switching power supply circuit as provided by the above embodiment.

DETAILED DESCRIPTION

Figure 1:
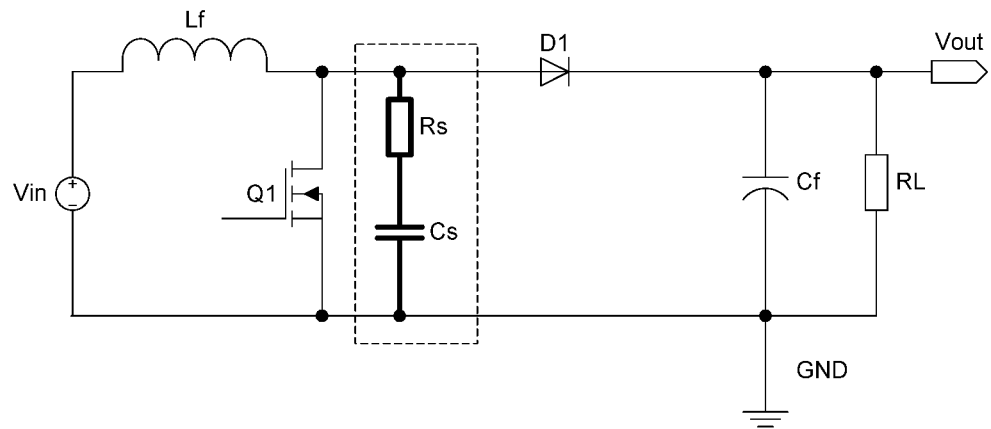
FIG. 1 is a schematic diagram of a switch circuit which is connected in parallel with an RC circuit in the prior art.

In the following the implementation procedures of the embodiments of the disclosure will be described in detail in conjunction with the accompanying drawings of the specification. It needs to be noted that identical or similar reference signs denote identical or similar elements or elements with identical or similar functions throughout. In the following, the embodiments described with reference to the drawings are exemplary and only used for explaining the invention, and cannot be understood as limiting the invention.

A switching power supply utilizes an electronic switching device (e.g., transistor, field effect transistor, controllable silicon thyristor), and by a control circuit, causes the electronic switching device to keep "on" and "off", and makes the electronic switching device pulse modulate the input voltage, thereby realizing DC/AC and DC/DC voltage transformation as well as output voltage adjustability and automatic voltage regulation. Switching power supply products are widely applied in industrial automation control, military equipments, scientific research equipments, LED lighting, industrial control equipments, communications equipments, power equipments, instrumentations, medical equipments, semiconductor refrigeration and heating, air purifiers, electronic refrigerators, liquid crystal displays, LED lamps, communications equipments, audio-visual products, security monitoring, LED light bags, computer cases, digital products and instruments and other fields. There are two kinds of modern switching power supply, one is the DC switching power supply, and the other is the AC switching power supply. Taking the DC switching power supply as an example, its function is to convert an original power supply with a poor power quality (rough electricity), for example, the mains supply and alternatively a storage battery power supply, into a DC voltage (fine electricity) with a higher quality which meets the requirements of an equipment. The core of the DC switching power supply is the DC/DC converter.

Although most of the following embodiments will be described in conjunction with the DC switching power supply (e.g., DC/DC), it needs to be noted that the absorption circuit according to embodiments of the disclosure is not only adapted for the DC switching power supply, but may also be used for the AC switching power supply at the same time.

According to the switching conditions of a switch transistor, the DC/DC converter may be further divided into two kinds, hard switching and soft switching. A switching device with the hard switching DC/DC converter switches on or off the circuit in a case where it bears a voltage or a current flow through it, and therefore in the procedure of switching on or off, a large overlap loss will be produced, that is, the so-called switching loss. When the working state of the converter is certain, the switching loss is also certain. Furthermore, the higher the switching frequency, the larger the switching loss is, and meanwhile, in the switching procedure, oscillation of the circuit distributed inductance and parasitic capacitance will also be excited, which brings about additional loss, and therefore, the switching frequency of the hard switching DC/DC converter cannot be too high. For a switch transistor with the soft switching DC/DC converter, in the procedure of switching on or off, either the voltage applied to it is zero, namely, zero voltage switching, and alternatively the current that passes through the switch transistor is zero, namely, zero current switching. Such a soft switching mode may significantly reduce the switching loss and the excited oscillation in the switching procedure, which results in that the switching frequency may be increased greatly, and creates conditions for miniaturization and modularization of converters. The working ways of the hard switching and the soft switching are different, and the embodiments of the disclosure involve the hard switching.

FIG. 1 shows a schematic diagram of a switch circuit which is connected in parallel with an RC absorption circuit according the prior art. Therein, in the dashed box is the RC absorption circuit, which is a circuit in which an absorption resistor Rs is connected in series with an absorption capacitor Cs, and which is at the same time connected in parallel with a switch transistor Q1. If the switch transistor Q1 is switched off, the energy accumulated in the parasitic inductor (not shown) will also charge the absorption capacitor Cs via the absorption resistor Rs, while it charges the parasitic capacitor (not shown) of the switch. As such, due to the effect of the absorption resistor Rs, its impedance will become larger, and therefore, the absorption capacitor Cs also equivalently increases the capacity of the parallel capacitor of the switch transistor Q1, thereby suppressing the voltage spike when the switch transistor Q1 is switched off. Whereas when the switch transistor Q1 is switched on, the absorption capacitor is discharged via the switch transistor Q1, and at this time, its discharge current will be limited by the absorption resistor Rs.

Figure 2:
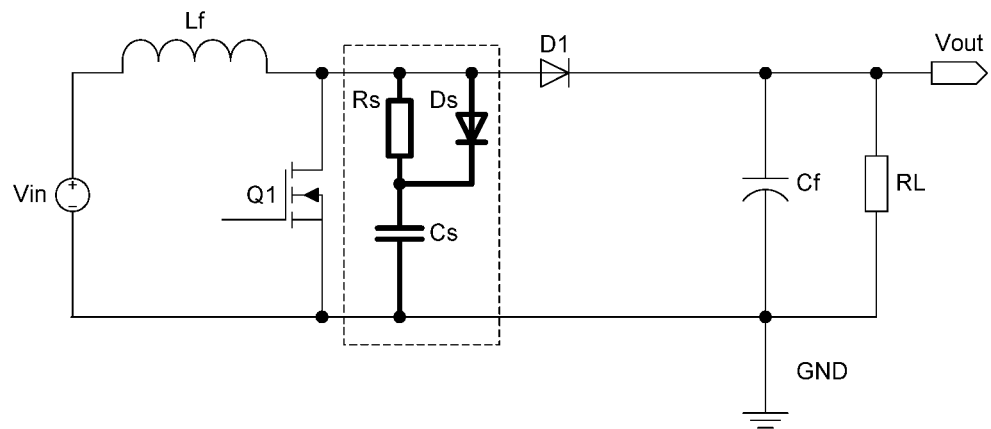
FIG. 2 is a schematic diagram of a switch circuit which is connected in parallel with an RCD circuit in the prior art.

FIG. 2 is a schematic diagram of a switch circuit which is connected in parallel with an RCD circuit in the prior art. Therein, in the dashed box is the RCD absorption circuit, which is a circuit in which an absorption resistor Rs is connected in parallel with an absorption diode Ds and then connected in series with an absorption capacitor Cs, and which is at the same time connected in parallel with a switch transistor Q1. If the switch transistor Q1 is switched off, the energy accumulated in the parasitic inductor (not shown) will charge via the parasitic capacitor (not shown) of the switch transistor Q1, and the voltage of the switch transistor rises. When its voltage rises to the voltage of the absorption capacitor Cs, the absorption diode Ds is conductive, thereby causing the switch voltage to be clamped by the absorption diode Ds, and at the same time the energy accumulated in the parasitic inductor (not shown) also charges the absorption capacitor Cs. During the switch-on of the switch transistor Q1, the absorption capacitor Cs discharges via the absorption resistor Rs. Since the RCD absorption circuit clamps the switch voltage via the diode, its effect is better than that of the RC absorption circuit, and meanwhile, it may also adopt larger resistance, but the energy loss is also less than the RC circuit. However, the clamping voltage of the RCD circuit will vary with the change of the load, and if the parameter design is not reasonable, the absorption circuit will decrease the efficiency of the system, and alternatively cause the switch transistor to be damaged since it cannot meet the clamping requirement.

The adoption of the RC and RCD absorption circuits may also degauss the transformer of a switching power supply, and it is not necessary to further set up a demagnetization circuit which consists of a transformer winding and a diode. The excitation energy of the transformer will be consumed in the absorption resistor. The RC and RCD absorption circuits may not only consume the energy accumulated in the leakage inductance of the transformer, but also consume the excitation energy of the transformer. Therefore, such a mode decreases the transformation efficiency of the transformer at the same time. A new absorption circuit is needed to improve this situation.

Figure 3:
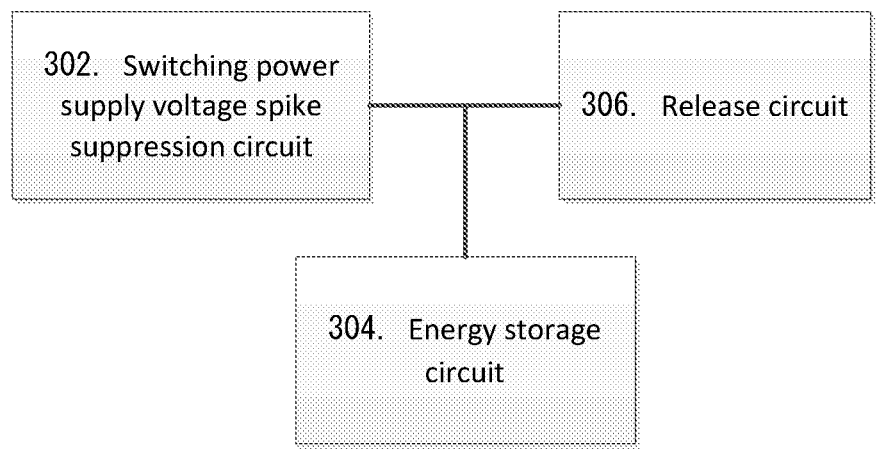
FIG. 3 is a modular schematic diagram of an absorption circuit provided by an embodiment of the disclosure which losslessly absorbs the spike voltage of a switching power supply.

Reference is made to FIG. 3, which shows a modular schematic diagram of an absorption circuit provided by an embodiment of the disclosure which losslessly absorbs the spike voltage of a switching power supply. The absorption circuit according to the embodiment of the disclosure is coupled to the switching power supply and comprises three parts: a switching power supply voltage spike suppression circuit 302, an energy storage circuit 304 and a release circuit 306. Therein, the switching power supply voltage spike suppression circuit 302 is used for changing a voltage spike of the switching power supply into a desired voltage spike, the energy storage circuit 304 is coupled to the switching power supply voltage spike suppression circuit and used for storing the spike voltage that is suppressed, and the release circuit 306 is coupled to the energy storage circuit 304 and used for, when the voltage stored by the energy storage circuit 304 is higher than the output voltage of the switching power supply, releasing the energy which is stored by the energy storage circuit 304 and higher than the output voltage of the switching power supply to the output terminal of the switching power supply. As a whole, the design idea of such an absorption circuit is to suppress the voltage spike, store the suppressed energy, and release it to the output terminal of the switching power supply. Alternatively or additionally, with the periodic switch-off and switch-on of the switch transistor of the switching power supply, the absorption circuit periodically performs suppression of the voltage spike, storage and release of the suppressed energy. In such a way, the absorption circuit reduces the spike voltage in the switching power supply which is coupled to it, decreases the energy loss of the switching power supply, and improves the overall conversion efficiency of the switching power supply.

Figure 4:
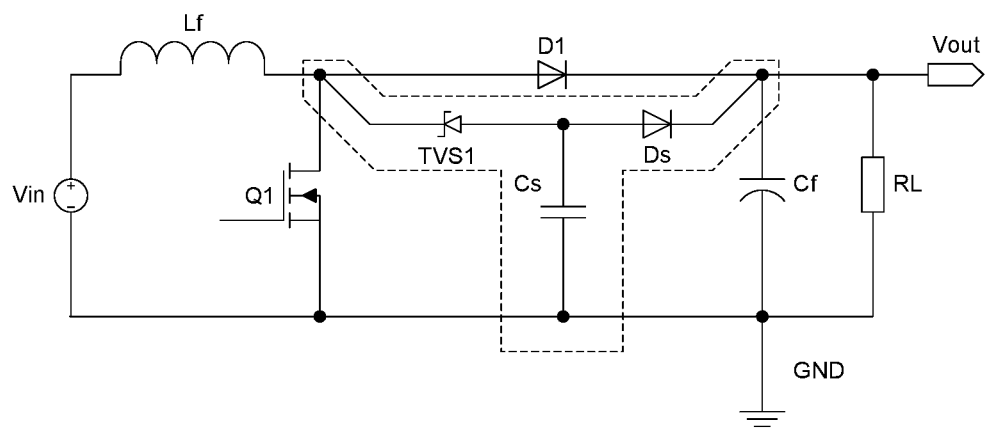
FIG. 4 is a schematic diagram of a switching power supply provided by an embodiment of the disclosure comprising an absorption circuit which losslessly absorbs the spike voltage of the switching power supply.

FIG. 4 is a schematic diagram of a switching power supply provided by an embodiment of the disclosure comprising an absorption circuit which losslessly absorbs the spike voltage of the switching power supply. In an instance, the absorption circuit provided according to embodiments of the disclosure is applied in a DC switching power supply. The DC switching power supply comprises an original DC power supply Vin, a filter inductor Lf, a filter capacitor Cf, a switch transistor Q1 and a freewheeling diode D1, wherein RL is a load resistor, Vout is the output voltage, and GND is the ground. The original DC power supply Vin is successively connected in series with the filter inductor Lf and the switch transistor Q1, wherein the negative pole of the DC power supply Vin and the source of the switch transistor Q1 are grounded, and additionally, the freewheeling diode D1 is connected in series with the filter capacitor Cf and then connected in parallel with the switch transistor Q1, and the load resistor RL is connected in parallel with the filter capacitor. Of course, the switching power supply according to embodiments of the disclosure or the DC switching power supply is not restricted to the switching power supply as shown in the figure, but may be any switching power supply which might produce the voltage spike.

Alternatively or additionally, the absorption circuit comprises a first diode TVS1, a second diode Ds and an absorption capacitor Cs. Therein, at least the first diode TVS1 constitutes the switching power supply voltage spike suppression circuit 302 in the embodiment of FIG. 3, at least the absorption capacitor Cs constitutes the energy storage circuit 304 in the embodiment of FIG. 3, and at least the second diode constitutes the release circuit 306 in the embodiment of FIG. 3. As shown, the cathode of the first diode TVS1 is coupled to the drain of the switch transistor Q1, while the anode of the first diode TVS1 is coupled to the anode of the second diode Ds and one side of the absorption capacitor Cs. The other side of the absorption capacitor Cs is grounded, and the cathode of the second diode is coupled to the output terminal of the switching power supply. Of course, it may also be that one or one set of other components which may suppress the voltage spike of the switching power supply constitute the switching power supply voltage spike suppression circuit 302 in the embodiment of FIG. 3, it may also be that one or one set of other components which may store the suppressed spike voltage constitute the energy storage circuit 304 in the embodiment of FIG. 3, and it may also be that one or one set of other components which may release the stored energy of the voltage spike to the output terminal of the switching power supply constitute the release circuit 306 in the embodiment of FIG. 3.

Therein, the switch transistor Q1 in the switching power supply is switched on and off periodically. When the switch transistor Q1 is switched off, for example, since the inductance (e.g., the transformer leakage inductance, the line distributed inductance, the inductive component in the device equivalent model, etc.) that might exist in the switching power supply induces inductance freewheeling, the voltage spike is then produced. Of course, when the switch transistor Q1 is implemented by employing a field effect transistor, the voltage spike may also be produced by the parasitic capacitor of the switch transistor Q1. The source producing the voltage spike will not be defined by embodiments of the disclosure.

The produced voltage spike of the switching power supply breaks down the first diode TVS1, and is absorbed (that is, voltage stored) by the absorption capacitor Cs. When the voltage of the absorption capacitor Cs is higher than the output voltage $V_{out}$, the second diode Ds is turned on, thereby releasing the energy ($V_{Cs}-V_{out}$) higher than the output voltage to the output terminal of the switching power supply. In general, $V_{out}$ is very low relatively to $V_{Cs}$, most of the energy of the spike voltage that is absorbed is outputted to the output terminal of the switching power supply, which may be deemed as "losslessly" absorbing the spike voltage. When the switch transistor Q1 is conductive, the absorption capacitor Cs, the first diode TVS1 and the switch transistor Q1 form a discharge circuit, which discharges the remaining voltage (of which the value is for example $V_{out}$) on the absorption capacitor Cs.

Alternatively or additionally, the breakdown voltage of the first diode TVS1 is configured as the resultant value of the desired voltage spike minus the output voltage $V_{out}$. Thus, adjustment of the desired voltage spike may be achieved by employing the first diode TVS1 with a different breakdown voltage.

Alternatively or additionally, the first diode is a transient voltage suppressor. The transient voltage suppressor is a high efficacy protective device in the form of diode. When the two poles of the transient voltage suppressor are subject to reverse high energy impacts, it may change the high impedance between its two poles into low impedance at a rate in the order of magnitude of $10^{-12}$ s, and absorb a transient over-voltage power up to several kilowatts, causing the voltage between the two poles to be clamped to a predetermined value.

Ideally, the selection of the second diode need take into account that its recovery time matches the switching frequency of the switching power supply. Thus, it may be possible to release the voltage on Cs to the output terminal of the switching power supply as soon as possible within one switching period of the switching power supply, and improve the efficiency of the diode rectification, thereby reducing the energy loss of the switching power supply as much as possible, and improving the overall conversion efficiency of the switching power supply.

In general, the reverse recovery time of a fast recovery diode is very short and below 5 us. In terms of performance, it may be further divided into two levels, fast recovery and ultra fast recovery. Generally, the reverse recovery time of the former is hundreds of nanoseconds or longer, and the latter below 100 nanoseconds. Yet the reverse recovery time of the Schottky diode may even reach several nanoseconds. In general, the switching frequency of the switching power supply is about 500 khz, that is, its period is about 2 us, and therefore, additionally or alternatively, the second diode Ds is a fast recovery diode. Of course, depending on the real switching frequency of the switching power supply and weighing the manufacture cost, the second diode D2 may also be configured as a Schottky diode, etc.

Figure 5:
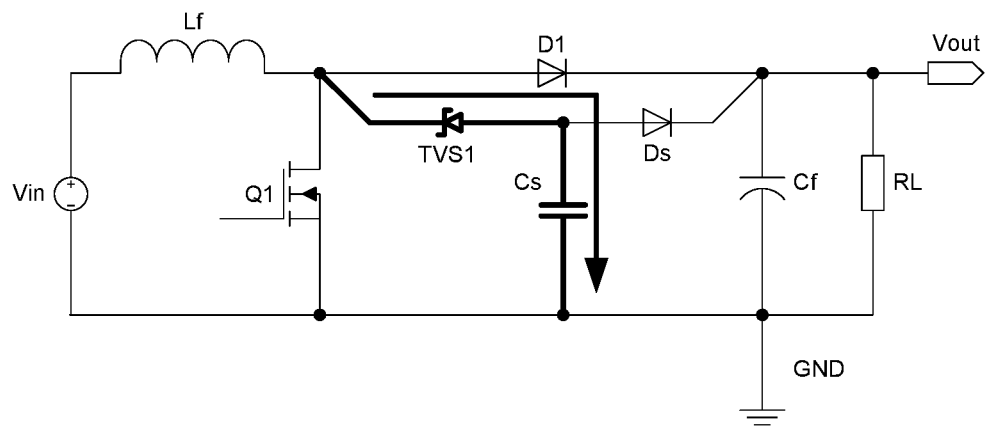
FIG. 5 shows the current direction of a first stage of the absorption circuit provided by an embodiment of the disclosure.
Figure 6:
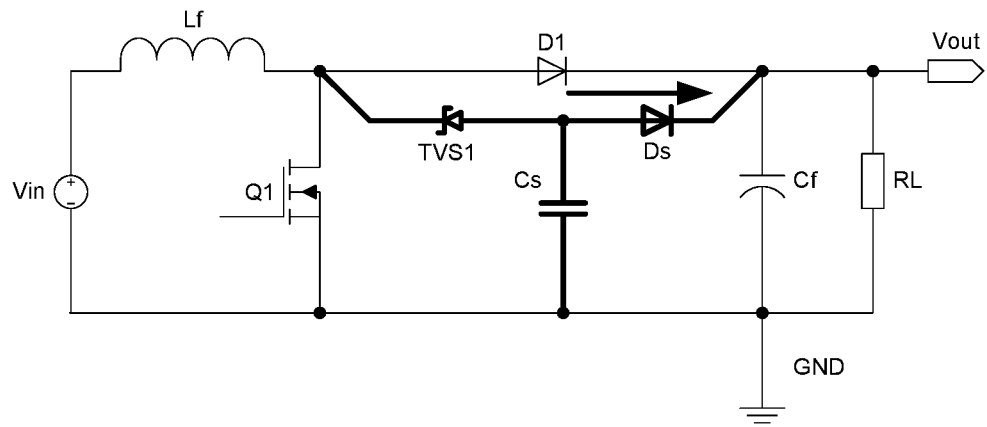
FIG. 6 shows the current direction of a second stage of the absorption circuit provided by an embodiment of the disclosure.

In the following, the current change in the procedure of absorption and release performed by the absorption circuit according to embodiments of the disclosure will be described with reference to FIG. 5 and FIG. 6. FIG. 5 shows the current direction of a first stage of the absorption circuit provided by an embodiment of the disclosure, and FIG. 6 shows the current direction of a second stage of the absorption circuit provided by an embodiment of the disclosure. The circuit diagram on which FIG. 5 and FIG. 6 are based is the same as FIG. 4. When the switch transistor Q1 changes from conduction to disconnection, at a first stage, the voltage of the cathode of the first diode TVS1 rises, and when it rises to the sum of the output voltage $V_{out}$ of the switching power supply and the breakdown voltage of the first diode TVS1, TVS1 is broken down, and the excess voltage is stored on the absorption capacitor Cs. At this point, the voltage of the cathode of TVS1 does not rise any longer, that is, the voltage spike is suppressed, and the energy of the voltage that is suppressed is transferred to the absorption capacitor Cs of the absorption circuit. The voltage on the absorption capacitor Cs keeps rising. At this stage, the first diode TVS1 is reversely conductive, and the current flows from the cathode of the first diode TVS1 to the absorption capacitor Cs. At a second stage, when the voltage on the absorption capacitor Cs rises to be greater than the sum of the output voltage $V_{out}$ of the switching power supply and the conduction voltage of the second diode Ds, the second diode Ds is conductive, and the current flows from the absorption capacitor Cs through the second diode Ds to the output terminal of the switching power supply, until the voltage of the absorption capacitor Cs is consistent with the voltage of the output terminal of the switching power supply. Since the output voltage of the switching power supply is relatively low, generally several volts, whereas the spike voltage may be up to tens of volts, most of the stored energy of the voltage spike is outputted to the output terminal of the switching power supply, thus decreasing the energy loss of the switching power supply and improving the overall conversion efficiency of the switching power supply.

It may also be possible that there is a time when the condition of the switching power supply circuit is good, at this point, the spike voltage is lower than the sum of the output voltage Vout of the switching power supply and the breakdown voltage of the first diode TVS1, thereby TVS1 will not be broken down, and the absorption circuit according to embodiments of the disclosure does not need to work. Therefore, the absorption circuit according to embodiments of the disclosure may be well adapted for the working conditions of the switching power supply.

Figure 7:
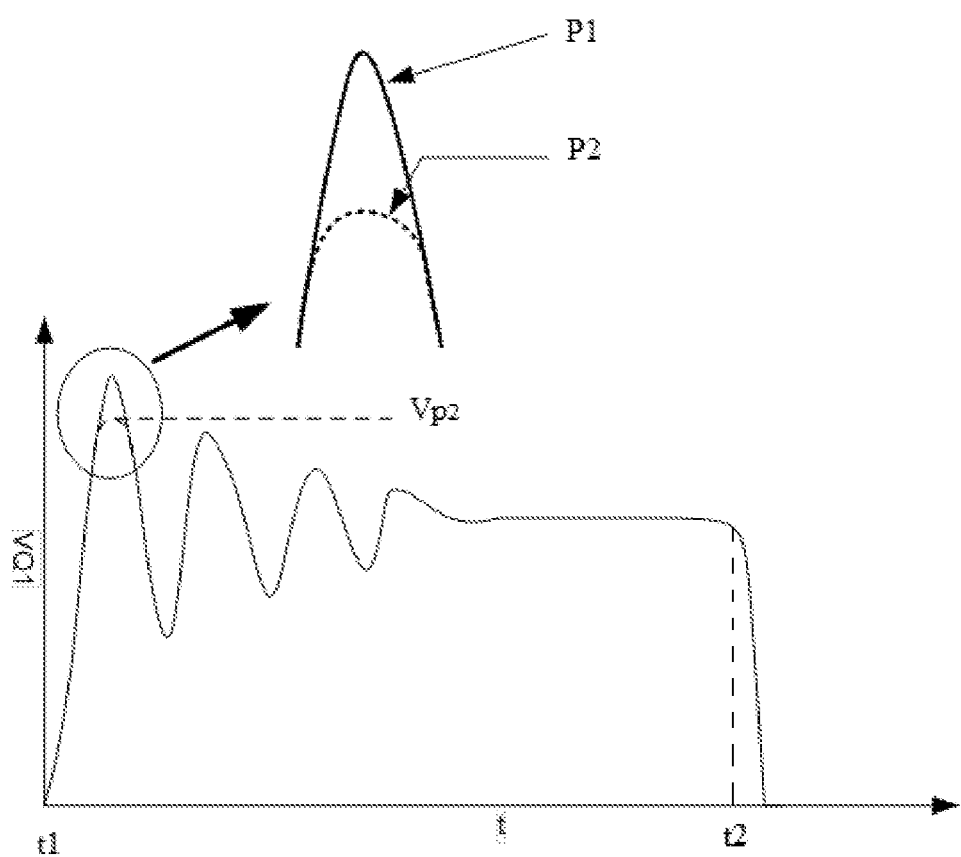
FIG. 7 shows a switch voltage diagram of the switching power supply provided by an embodiment of the disclosure within a switching period.

FIG. 7 shows a switch voltage diagram of the switching power supply provided by an embodiment of the disclosure within a switching period. It corresponds to a circuit of any of FIGS. 4-6. Therein, the horizontal coordinate represents time, and the vertical coordinate represents the voltage of the switch transistor Q1. At the time t1, the switch transistor Q1 changes from conduction to disconnection, and the voltage $V_{Q1}$ of the drain of the switch transistor keeps rising. If the absorption circuit did not exist, $V_{Q1}$ will show a spike P1, which is enlarged in FIG. 7 so as to be seen clearly. However, after the absorption circuit according to embodiments of the disclosure is applied, $V_{Q1}$ shows a suppressed spike P2 which replaces the spike P1. Clearly, the peak voltage $V_{p2}$ of the spike P2 is lower than the peak voltage of the spike P1. As described in connection with FIG. 4 previously, the peak voltage $V_{p2}$ of the spike P2 may be adjusted by configuring the first diode TVS1 with a different breakdown voltage, and thereby the components of the circuit may be well protected, such that they work within a normal working voltage range. Since the parasitic inductor and capacitor and the like exist, ringing inevitably occurs to $V_{Q1}$, until the stable state is reached, and at this moment, the stable voltage of $V_{Q1}$ is the sum of the output voltage Vout of the switching power supply, the conduction voltage of the second diode Ds and the reverse conduction voltage of the first diode TVS1. Afterwards, at the time t2, when the switch transistor Q1 is conductive, the drain of the switch transistor is equivalent to being grounded, and its voltage drops to zero rapidly. The falling curve as shown is close to a straight line, but it is actually also of the shape of a quadratic function if it is seen when unfolded, which results from the characteristics of the capacitor Cs.

Figure 8:
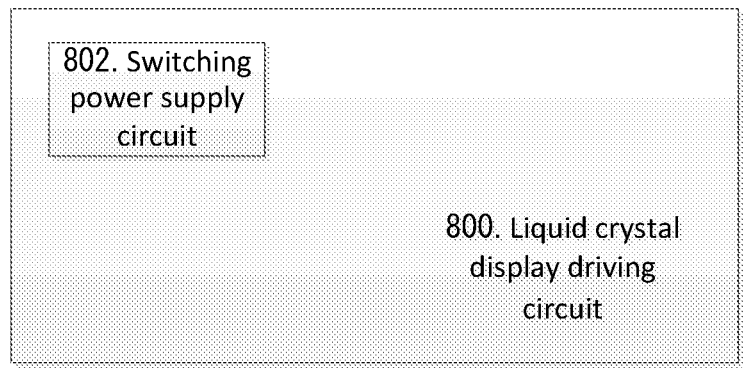
FIG. 8 shows a liquid crystal display driving circuit provided by an embodiment of the disclosure.

According to an embodiment of the disclosure, there is further provided a liquid crystal display driving circuit. With reference to FIG. 8, the liquid crystal display driving circuit 800 comprises a switching power supply circuit 802 according to one or more embodiment of the disclosure.

It may be appreciated by those skilled in the art that the drawings are only schematic diagrams of an embodiment, and the modules in the drawings are not necessarily essential or unique for implementing the invention.

It may be appreciated by those skilled in the art that the modules in an apparatus in an embodiment may be distributed in the apparatus of the embodiment according to the description of the embodiment, and may also be changed accordingly to be located in one or more apparatus different from the embodiment. The modules of the embodiments may be merged into one module, and where possible, may also be further split into a plurality of sub-modules.

Clearly, various changes and variations to the disclosure may be made by the skilled in the art without departing from the spirit and scope of the disclosure. Thus, if these modifications and variations to the disclosure pertain to the scope of the claims and their equivalents of the invention, the invention is also intended to encompass these changes and variations.

The invention claimed is:

1. An absorption circuit connected with a switching power supply, wherein the absorption circuit comprises:
   a switching power supply voltage spike suppression circuit for changing a voltage spike of the switching power supply into a desired voltage spike, consisting of a first diode,
   an energy storage circuit which is coupled to the switching power supply voltage spike suppression circuit and used for storing the spike voltage that is suppressed, consisting of a capacitor, and
   a release circuit which is coupled to the energy storage circuit and used for, when the voltage stored by the energy storage circuit is higher than the output voltage of the switching power supply, releasing the energy which is stored by the energy storage circuit and higher than the output voltage to the output terminal of the switching power supply, consisting of a second diode,
   wherein the cathode of the first diode is coupled to the drain of the switch transistor of the switching power supply, the anode of the first diode, one side of the capacitor and the anode of the second diode are connected, the other side of the capacitor is grounded, and the cathode of the second diode is coupled to the output terminal of the switching power supply, and
   wherein the capacitor is configured to absorb the voltage spike of the switching power supply after the voltage spike breaks down the first diode, and when the voltage of the capacitor is higher than the output voltage, the second diode is switched on, thereby releasing the energy that is higher than the output voltage to the output terminal of the switching power supply.

2. The absorption circuit as claimed in claim 1, wherein the breakdown voltage of the first diode is configured as the resultant value of the desired voltage spike minus the output voltage.

3. The absorption circuit as claimed in claim 1, wherein the first diode is a transient voltage suppressor.

4. The absorption circuit as claimed in claim 1, wherein the second diode is a fast recovery diode.

5. A switching power supply circuit comprising a power supply and a switch transistor, comprising an absorption circuit as claimed in claim 1.

6. A liquid crystal display driving circuit, comprising a switching power supply circuit as claimed in claim 5.

7. The absorption circuit as claimed in claim 1, further comprising a freewheeling diode, whose anode is coupled to the drain of the switch transistor and cathode is coupled to the output terminal of the switching power supply.

8. The absorption circuit as claimed in claim 1, wherein the second diode is a Schottky diode.

* * * * *